United States Patent
Kudikala et al.

(10) Patent No.: US 9,497,096 B2
(45) Date of Patent: *Nov. 15, 2016

(54) DYNAMIC CONTROL OVER TRACING OF MESSAGES RECEIVED BY A MESSAGE BROKER

(71) Applicant: International Business Machines Corporation, Armonk, NY (US)

(72) Inventors: Shravan K. Kudikala, Hyderabad (IN); Amar A. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/874,138

(22) Filed: Apr. 30, 2013

(65) Prior Publication Data

US 2013/0254313 A1    Sep. 26, 2013

Related U.S. Application Data

(63) Continuation of application No. 13/426,731, filed on Mar. 22, 2012.

(51) Int. Cl.

| | |
|---|---|
| *G06F 15/173* | (2006.01) |
| *H04L 12/26* | (2006.01) |
| *H04L 29/08* | (2006.01) |
| *H04L 12/58* | (2006.01) |
| *H04L 29/06* | (2006.01) |
| *G06F 11/36* | (2006.01) |

(Continued)

(52) U.S. Cl.
CPC ............ *H04L 43/10* (2013.01); *H04L 51/00* (2013.01); *H04L 67/22* (2013.01); *H04L 69/22* (2013.01); *G06F 11/323* (2013.01); *G06F 11/36* (2013.01); *G06F 21/00* (2013.01); *H04L 12/5885* (2013.01)

(58) Field of Classification Search
None
See application file for complete search history.

(56) References Cited

U.S. PATENT DOCUMENTS

| | | | |
|---|---|---|---|
| 5,642,478 A | 6/1997 | Chen et al. | |
| 6,269,396 B1 * | 7/2001 | Shah | ............ H04L 12/2602 709/223 |
| 6,367,036 B1 | 4/2002 | Hansen | |

(Continued)

OTHER PUBLICATIONS

"Oracle® Database Performance Tuning Guide," http://download.oracle.com/docs/cd/B19306_01/server.102/b14211/sqltrace.htm, 2008.

(Continued)

*Primary Examiner* — Viet Vu
*Assistant Examiner* — James Edwards
(74) *Attorney, Agent, or Firm* — Robert A. Voigt, Jr.; Winstead, P.C.

(57) ABSTRACT

A method, system and computer program product for dynamically controlling a tracing of messages. A header (referred to herein as the "trace header") is placed in a message by a sending application, where the trace header includes a structure for storing fields of data for defining tracing operations. Once the message with the trace header is received by a message broker after being sent by the sending application, the message broker will analyze the fields of the trace header and perform the appropriate tracing operation in response to the information provided in the trace header. Through the use of the trace header, the tracing overhead can be minimized as well as a faster diagnosis of the problem (e.g., errors while processing the messages through a message flow of the message broker) can be provided since less data will be needed to be analyzed.

7 Claims, 7 Drawing Sheets

(51) Int. Cl.
*G06F 11/32* (2006.01)
*G06F 21/00* (2013.01)

(56) References Cited

U.S. PATENT DOCUMENTS

| | | | |
|---|---|---|---|
| 6,480,886 B1 | 11/2002 | Paice | |
| 6,983,463 B1* | 1/2006 | Hunt | G06F 9/5066 709/201 |
| 7,146,615 B1 | 12/2006 | Hervet et al. | |
| 8,006,140 B2 | 8/2011 | Khanna | |
| 8,055,757 B2 | 11/2011 | Watkins | |
| 8,356,096 B2* | 1/2013 | Gracieux | H04L 43/062 702/179 |
| 2003/0018808 A1 | 1/2003 | Brouk et al. | |
| 2003/0065764 A1* | 4/2003 | Capers | G06F 11/3476 709/224 |
| 2003/0169738 A1* | 9/2003 | McDaniel | H03M 13/09 370/392 |
| 2004/0022197 A1* | 2/2004 | Gagnon | H04J 3/14 370/242 |
| 2004/0030890 A1 | 2/2004 | Chu et al. | |
| 2004/0039809 A1* | 2/2004 | Ranous | H04L 29/06 709/223 |
| 2004/0153635 A1* | 8/2004 | Kaushik | G06F 11/3636 712/236 |
| 2004/0230874 A1* | 11/2004 | Prang | G06F 11/3466 714/39 |
| 2005/0276386 A1 | 12/2005 | Ethier et al. | |
| 2006/0029203 A1 | 2/2006 | Bhusri | |
| 2006/0085797 A1 | 4/2006 | Connelly | |
| 2006/0155932 A1 | 7/2006 | Rasche et al. | |
| 2006/0212761 A1* | 9/2006 | Levine | G06F 11/3476 714/45 |
| 2006/0229064 A1 | 10/2006 | Pitkamaki et al. | |
| 2006/0259634 A1* | 11/2006 | Hood | G05B 19/056 709/230 |
| 2007/0143474 A1* | 6/2007 | Sheng | G06F 11/3495 709/224 |
| 2007/0147261 A1 | 6/2007 | Schumacher et al. | |
| 2008/0127205 A1 | 5/2008 | Barros | |
| 2009/0064193 A1 | 3/2009 | Chijiiwa et al. | |
| 2009/0319621 A1* | 12/2009 | Barsness | G06F 11/0724 709/206 |
| 2010/0218188 A1* | 8/2010 | Jackson | G06F 11/3419 718/100 |
| 2012/0137181 A1 | 5/2012 | Thompson | |
| 2014/0022910 A1 | 1/2014 | Zhang et al. | |

OTHER PUBLICATIONS

"9.2 (Trace) Loggin," http://www.eclipse.org/virgo/documentation/virgo-documentation-2.1.0.RELEASE/docs/virgo-user-guide/html/ch09s02.html, 2010.

"Application-specific Cross-Component Trace," http://publib.boulder.ibm.com/infocenter/dmndhelp/v7r0mx/index.jsp?topic=/com.ibm.websphere.wesb.doc/doc/capp_spec_xct.html, 2010.

Office Action for U.S. Appl. No. 13/426,731 dated Feb. 13, 2015, pp. 1-21.

Office Action for U.S. Appl. No. 13/426,731 dated Jul. 10, 2015, pp. 1-32.

Office Action for U.S. Appl. No. 13/426,731 dated Feb. 1, 2016, pp. 1-29.

* cited by examiner

DYNAMIC CONTROL OVER TRACING OF MESSAGES RECEIVED BY A MESSAGE BROKER

CROSS-REFERENCE TO RELATED APPLICATIONS

The present application is a continuation application of pending U.S. patent application Ser. No. 13/426,731, which was filed on Mar. 22, 2012, which is assigned to the assignee of the present invention. The present application claims priority benefits to U.S. patent application Ser. No. 13/426,731.

TECHNICAL FIELD

The present invention relates generally to message brokers, and more particularly to dynamic control over tracing of messages received by a message broker.

BACKGROUND

Message (event) brokers are common middleware for large computer installations. Middleware is software that mediates between an application program and a network, managing the interaction between disparate applications across heterogeneous computing systems or platforms. These systems or platforms may be arranged in multiple layers, with an underlying system and multiple systems overlaying one another.

Message broker applications integrate existing software applications by typically providing mechanisms for connecting, routing, and transforming business data (messages) from a variety of transports without the need to change the underlying applications generating/consuming the data. Message flows are single threaded programs that process messages in a message broker. Message flows are considered the basic building blocks for message brokers. These message flows may run in a container called an execution group.

The messages from various applications are received by the message broker and transformed and routed through these message flows. It is a common usage that different applications (e.g., Transmission Control Protocol/Internet Protocol (TCP/IP) based applications, files, web services clients (e.g., Hypertext Transfer Protocol (HTTP), Simple Object Access Protocol (SOAP) and Systems Applications and Products (SAP) based applications) connect to the same message flow. Their messages will then get interpreted, processed and routed to the various destinations by the message broker. In the situation where there are some errors while processing the messages through the message flow, a trace to record information about the program's execution involving the processing of these messages through the message flow may be implemented and analyzed to diagnose the cause of these errors. Currently, such tracing activities are performed either on the execution group level or on a message flow level. That is, such tracing activities are performed on the execution group or on an individual message flow containing messages from different applications. However, the problem may be caused from messages being sent from a particular application. Hence, it would be ideal to trace only those messages from that particular application thereby minimizing the tracing overhead as well as providing a faster diagnosis of the problem since less data is needed to be analyzed.

In another situation, the message broker may implement multiple instances of a message flow (thereby having multiple threads of the same message flow) to process the input messages in parallel so to manage the incoming load. The messages received by the message broker may be inputted to a queue, where the messages in the queue are randomly selected by the message flow threads. As an example, one of the message flow threads may select a first message from a first application followed by selecting a second message from a second application. Similarly, as discussed above, if there are some errors while processing the messages through a message flow thread, and such errors were caused from messages from a particular application, it would be desirable to perform a trace of messages from that particular application on that message flow thread thereby minimizing the tracing overhead as well as providing a faster diagnosis of the problem since less data is needed to be analyzed.

BRIEF SUMMARY

In one embodiment of the present invention, a method for dynamically controlling a tracing of messages comprises receiving a message, where the message comprises a header, where the header comprises a structure for storing fields of data used for defining tracing operations. The method further comprises performing, by a processor, a trace of the message in response to the header indicating the trace is to be performed.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for dynamically controlling a tracing of messages. In one embodiment of the present invention, a header (referred to herein as the "trace header") is placed in a message by a sending application, where the trace header includes a structure for storing fields of data for defining tracing operations. Once the message with the trace header is received by a message broker after being sent by the sending application, the message broker will analyze the fields of the trace header and perform the appropriate tracing operation in response to the information provided in the trace header. Through the use of the trace header, the tracing overhead can be minimized as well as a faster diagnosis of the problem (e.g., errors while processing the messages through a message flow of the message broker) can be provided since less data will be needed to be analyzed.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
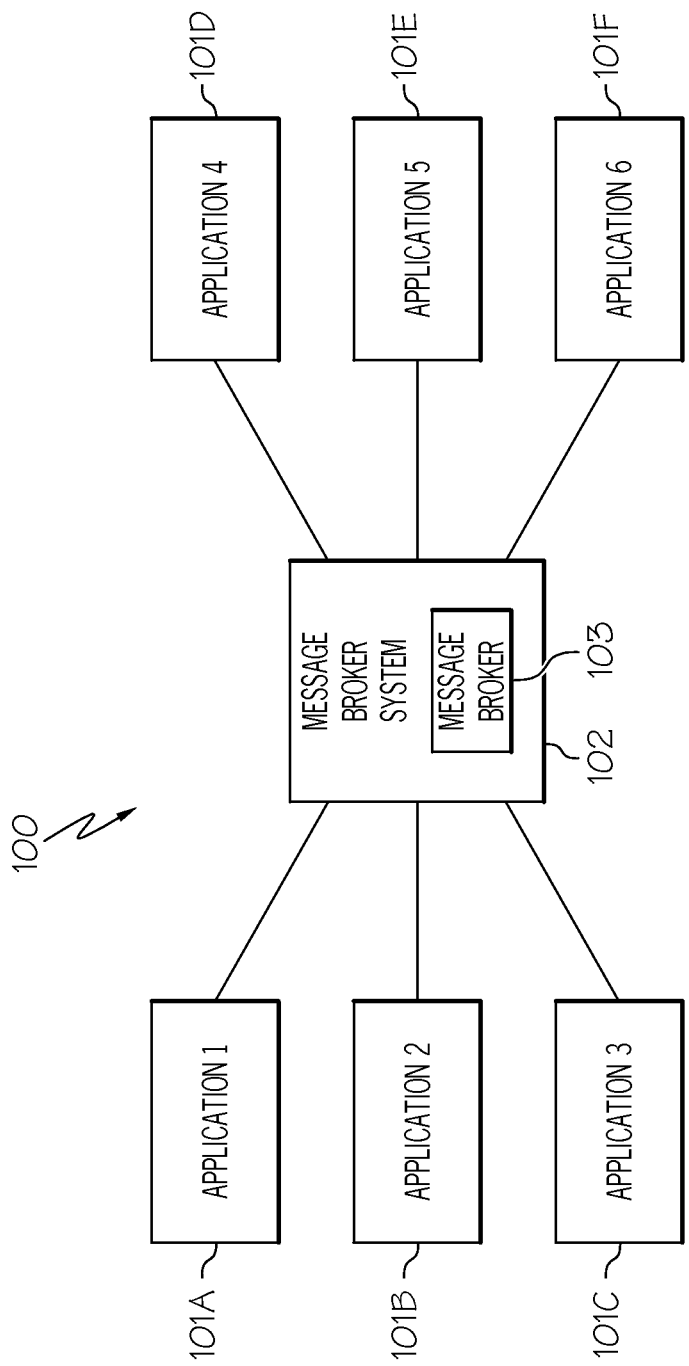
FIG. 1 illustrates a messaging system configured in accordance with an embodiment of the present invention.

Referring now to the Figures in detail, FIG. 1 illustrates a messaging system 100 for practicing the principles of the present invention in accordance with an embodiment of the present invention. Messaging system 100 includes applications 101A-101F (identified as "Application 1," "Application 2," "Application 3," "Application 4," "Application 5," and "Application 6," respectively, in FIG. 1) connected to a message broker system 102. Applications 101A-101F may collectively or individually be referred to as applications 101 or application 101, respectively. Message broker system 102 includes a software component, referred to herein as a message broker 103. A description of the hardware configuration of message broker system 103 is provided below in connection with FIG. 3. Each application 101 (e.g., TCP/IP based applications, files, web services clients, SAP based applications, etc.) is configured to send a message to another application 101 via message broker 103 or be a recipient of a message sent from another application 101 via message broker 103.

Message broker 103 is configured to receive incoming messages from a sending application, such as application 101A, and perform one or more actions on the incoming message, such as transforming the messages to an alternative representation; routing the messages to one or more of the many possible destinations, such as to applications 101D-101F; and performing message aggregating, decomposing messages into multiple messages and sending them to their destination, then recomposing the responses into one message to be returned to the originator (e.g., application 101A). These messages get processed in message broker 103 via message flows (single threaded programs), which may run in a container called an execution group. Message broker 103 may also implement multiple instances of a message flow thereby having multiple threads of the same message flow to process the input messages in parallel so as to manage the incoming load (i.e., the incoming messages) as discussed below in connection with FIG. 2.

While FIG. 1 illustrates six applications 101, messaging system 100 may include any number of applications 101 sending and receiving messages via message broker 103. The embodiments of messaging system 100 are not to be limited in scope to the depiction of FIG. 1.

Figure 2:
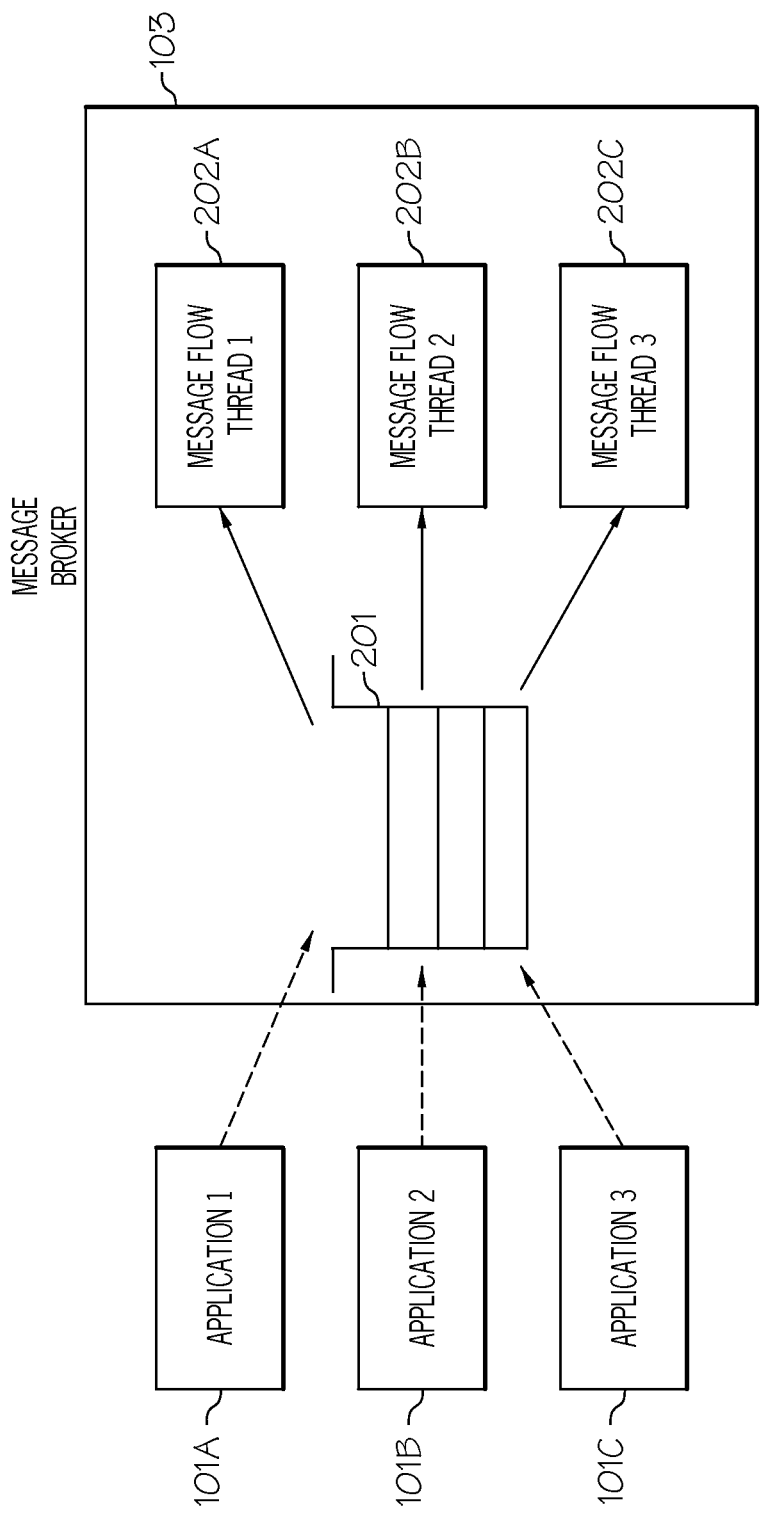
FIG. 2 illustrates a message broker implementing multiple instances of a message flow in accordance with an embodiment of the present invention.

Referring now to FIG. 2, FIG. 2 illustrates message broker 103 (FIG. 1) implementing multiple instances of a message flow in accordance with an embodiment of the present invention. As illustrated in FIG. 2, message broker 103 may include a queue 201 for inputting messages sent by applications 101, such as applications 101A-101C. Message broker 103 may implement multiple instances of a message flow thereby having multiple threads 202A-202C (identified as "Message Flow Thread 1," "Message Flow Thread 2," and "Message Flow Thread 3," respectively, in FIG. 2). Message flow threads 202A-202C may collectively or individually be referred to as message flow threads 202 or message flow thread 202. The messages inputted to queue 201 may be randomly selected by message flow threads 202. When there are some errors while processing the messages through a message flow thread 202, and such errors were caused from messages from a particular application 101 (e.g., application 101A), a trace of the messages from that particular application 101 (e.g., application 101A) will be able to be performed using the principles of the present invention as discussed further below thereby minimizing the tracing overhead as well as providing a faster diagnosis of the problem since less data is needed to be analyzed.

Figure 3:
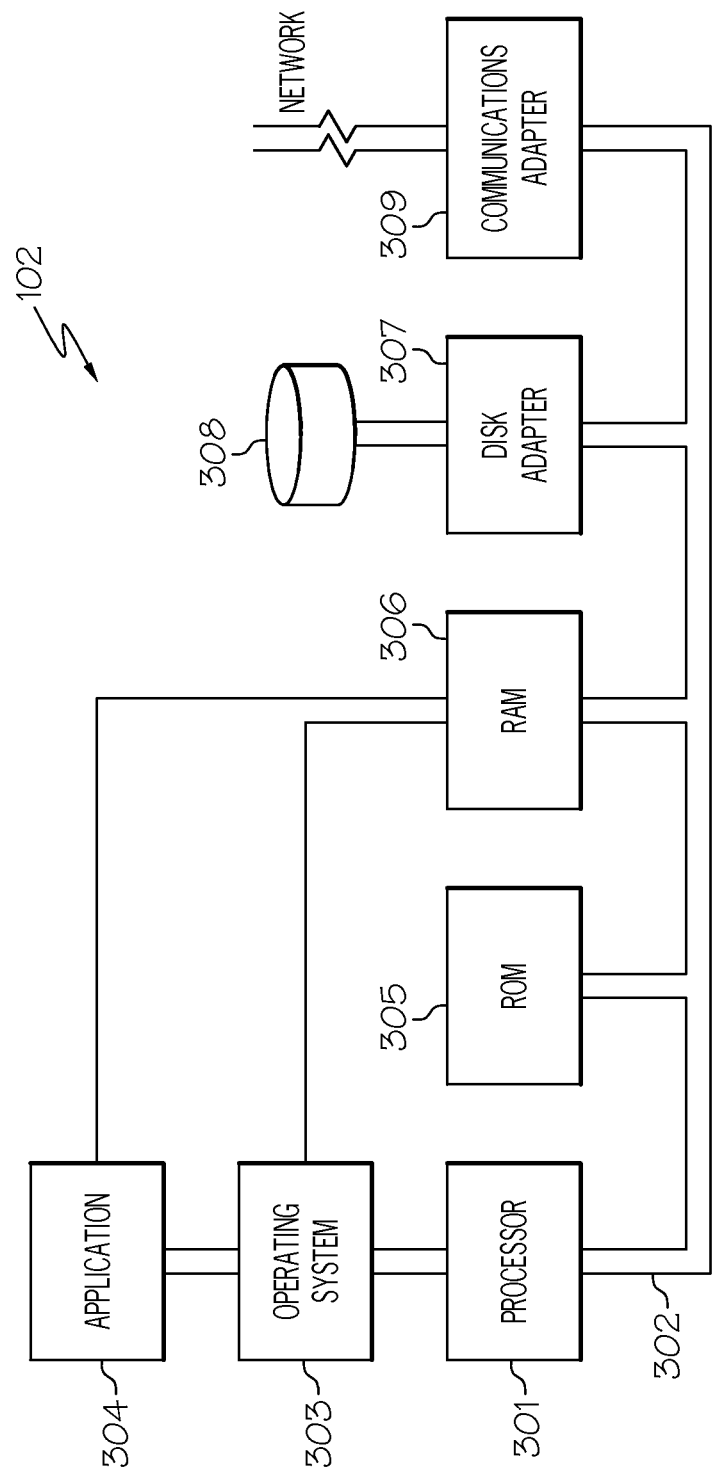
FIG. 3 illustrates a hardware configuration of a message broker system in accordance with an embodiment of the present invention.

Referring now to FIG. 3, FIG. 3 illustrates a hardware configuration of message broker system 102 (FIG. 1) which is representative of a hardware environment for practicing the present invention. Referring to FIG. 3, message broker system 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, message broker 103 configured to dynamically control a tracing of messages as discussed further below in association with FIGS. 4, 5A-5B and 6.

Referring again to FIG. 3, read-only memory ("ROM") 305 is coupled to system bus 302 and includes a basic input/output system ("BIOS") that controls certain basic functions of message broker system 102. Random access memory ("RAM") 306 and disk adapter 307 are also coupled to system bus 302. It should be noted that software components including operating system 303 and application 304 may be loaded into RAM 306, which may be message broker system's 102 main memory for execution. Disk adapter 307 may be an integrated drive electronics ("IDE") adapter that communicates with a disk unit 308, e.g., disk drive.

Message broker system 102 may further include a communications adapter 309 coupled to bus 302. Communications adapter 309 interconnects bus 302 with an outside network thereby enabling message broker system 102 to communicate with applications 101 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, messages from various applications are received by the message broker and transformed and routed through message flows. In the situation where there are some errors while processing the messages through the message flow, a trace to record information about the program's execution involving the processing of these messages through the message flow may be implemented and analyzed to diagnose the cause of these errors. Currently, such tracing activities are performed either on the execution group level or on a message flow level. That is, such tracing activities are performed on the execution group or on an individual message flow containing messages from different applications. However, the problem may be caused from messages being sent from a particular application. Hence, it would be ideal to trace only those messages from that particular application thereby minimizing the tracing overhead as well as providing a faster diagnosis of the problem since less data is needed to be analyzed. In another situation, the message broker may implement multiple instances of a message flow (thereby having multiple threads of the same message flow) to process the input messages in parallel so to manage the incoming load. The messages received by the message broker may be inputted to a queue, where the messages in the queue are randomly selected by the message flow threads. As an example, one of the message flow threads may select a first message from a first application followed by selecting a second message from a second application. Similarly, as discussed above, if there are some errors while processing the messages through a message flow thread, and such errors were caused from messages from a particular application, it would be desirable to perform a trace of messages from that particular application on that message flow thread thereby minimizing the tracing overhead as well as providing a faster diagnosis of the problem since less data is needed to be analyzed.

Figure 4:
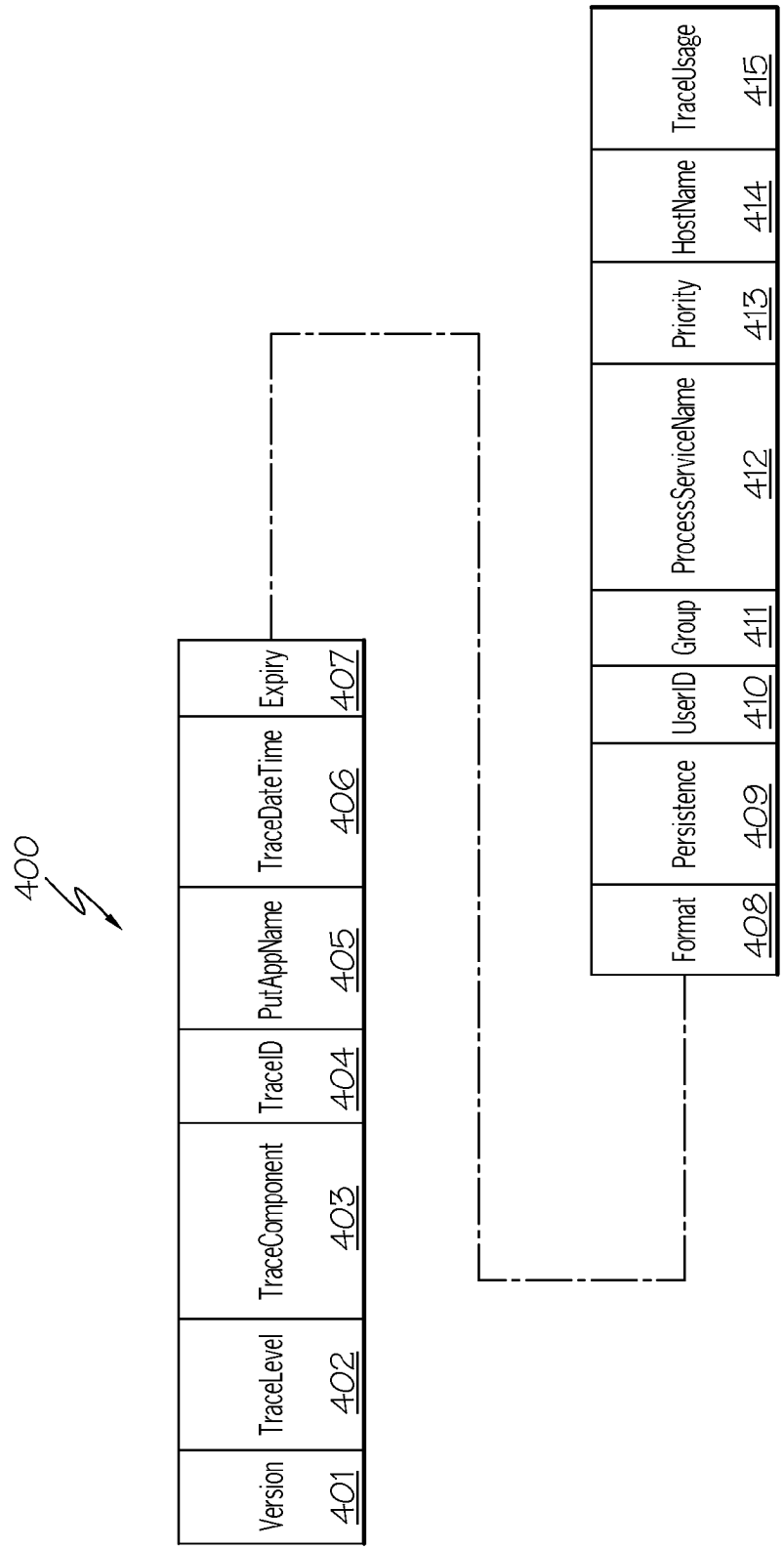
FIG. 4 illustrates a structure of a trace header in accordance with an embodiment of the present invention.
Figure 5A:
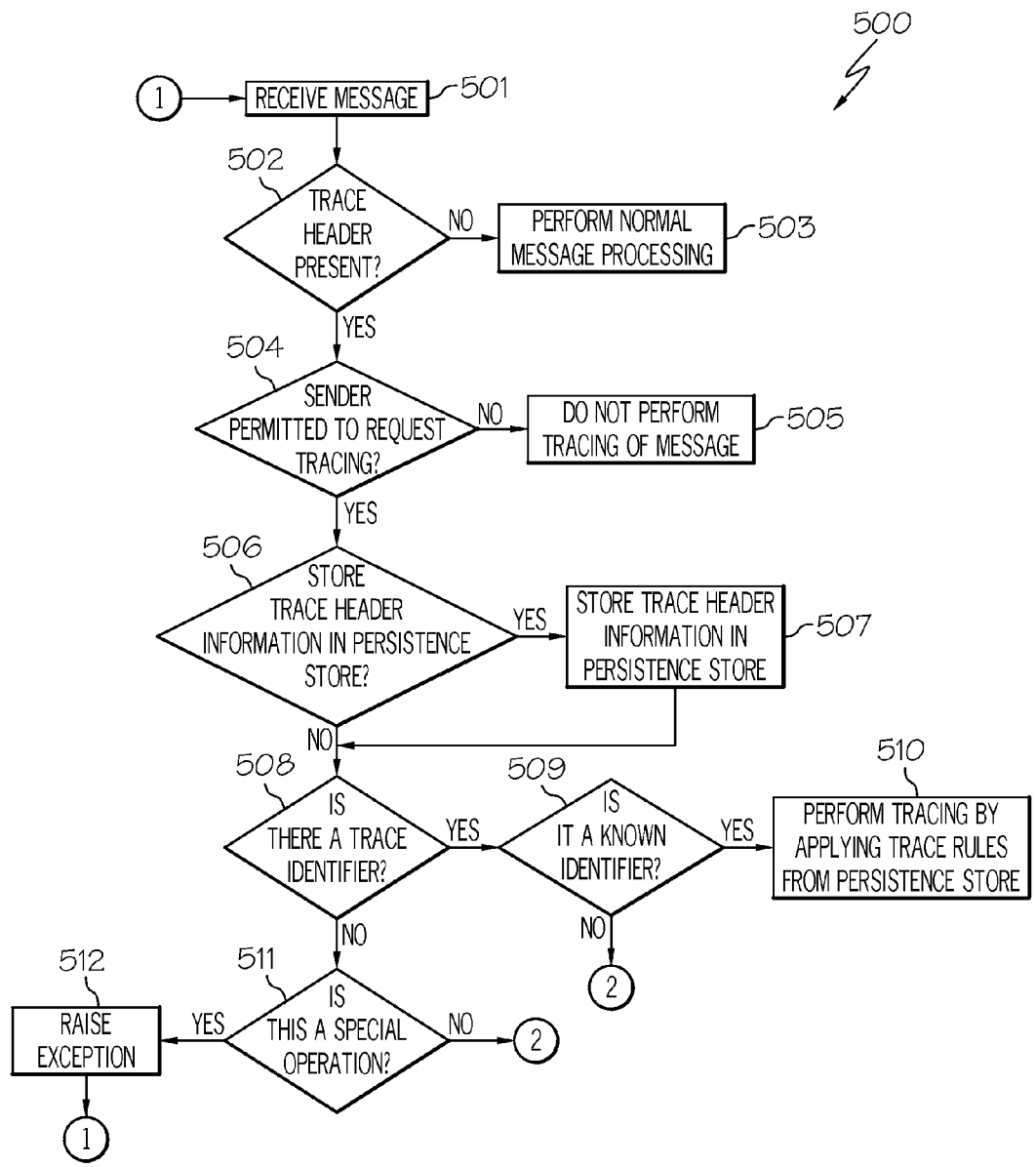
FIGS. 5A-5B are a flowchart of a method for dynamically controlling a tracing of messages in accordance with an embodiment of the present invention.
Figure 5B:
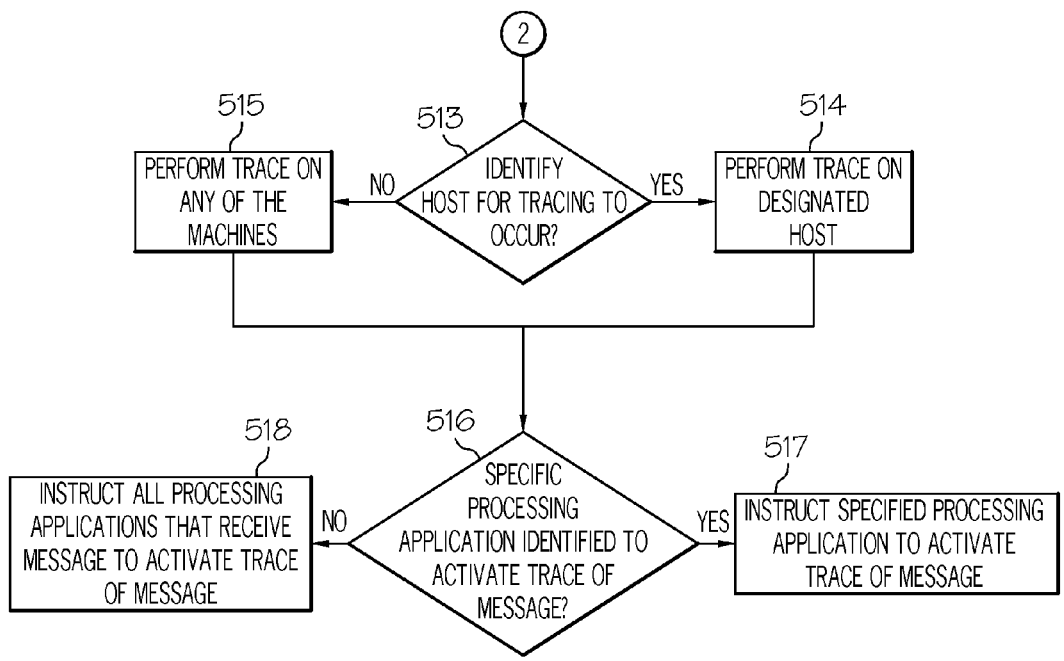
Figure 6:
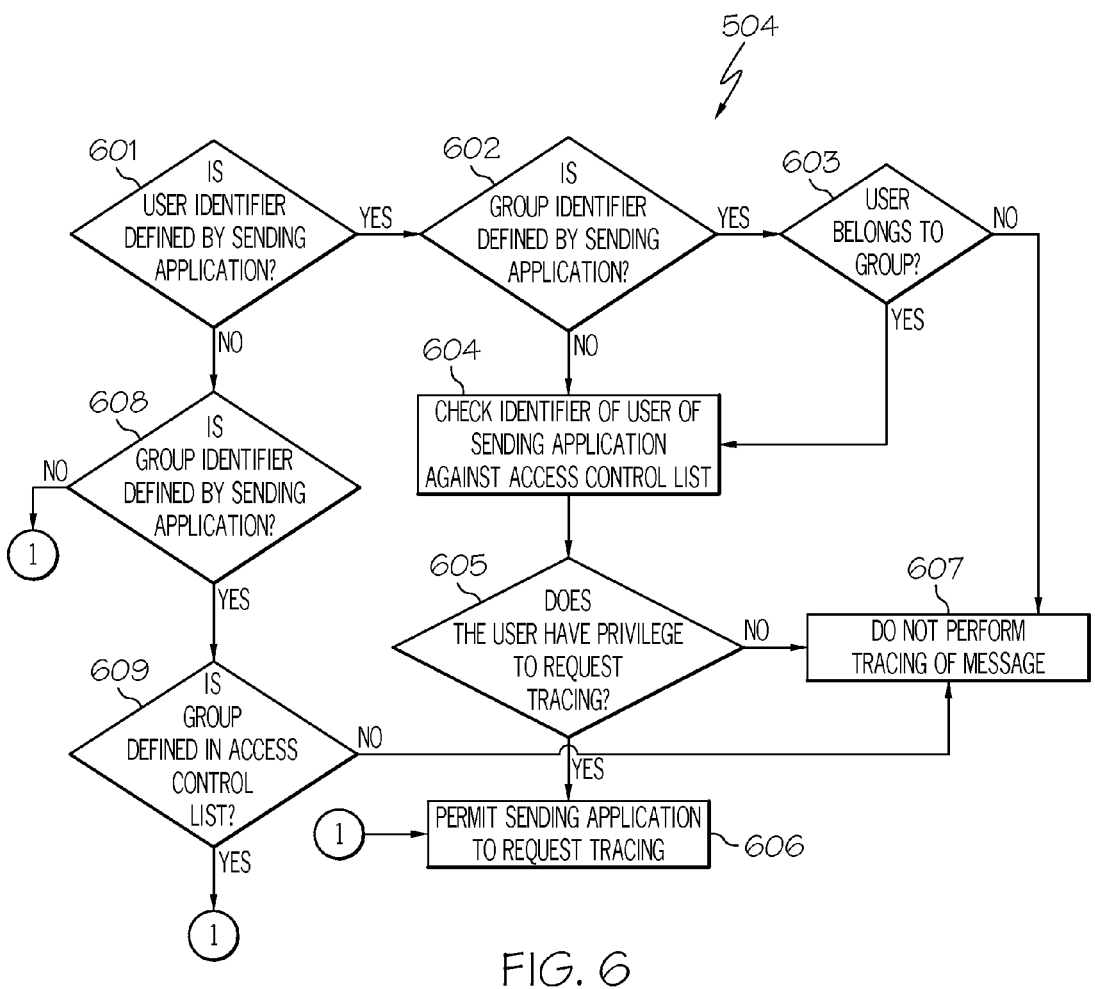
FIG. 6 is a flowchart of the sub-steps of determining whether the sender has permission to request the tracing of the message in accordance with an embodiment of the present invention.

The principles of the present invention provide a means for dynamically controlling tracing, including tracing only those messages coming from a specific application or tracing a specific message from a specific sending application, as discussed further below in FIGS. 4, 5A-5B and 6. FIG. 4 illustrates a header (supplemental data placed at the beginning of the message) (referred to herein as the "trace header") placed in the message by sending application 101 (FIG. 1) which includes a structure for storing fields of data for defining tracing operations. Through the use of the trace header, as discussed further below, the tracing overhead can be minimized as well as a faster diagnosis of the problem can be provided since less data will be needed to be analyzed. FIGS. 5A-5B are a flowchart of a method for dynamically controlling a tracing of messages. FIG. 6 is a flowchart of the sub-steps for determining whether the sender has permission to request the tracing of the message.

As stated above, FIG. 4 illustrates a header, referred to herein as the trace header 400, placed in the message by sending application 101 (FIG. 1) which includes a structure for storing fields of data for defining tracing operations in accordance with an embodiment of the present invention.

Referring to FIG. 4, in conjunction with FIG. 1, trace header 400, which is placed in the message by sending application 101, includes various fields of data for defining tracing operations, including field 401 (identified as "Version") which defines the version of trace header 400. In one embodiment, as software enhancements occur, the structure of trace header 400 may change in the future. As a result, there may be different versions of trace headers 400. By storing the appropriate version of trace header 400, message broker 103 will perform correctly during trace execution according to the version identified in trace header 400.

Trace header 400 includes field 402 (identified by "TraceLevel") which defines the trace level.

Trace header 400 further includes field 403 (identified by "TraceComponent") which defines the component to be traced. In one embodiment, message broker 103 defines an enumeration table, such as "1" for database interactions, "2" for IBM® WebSphere® MQ interactions, "3" for file based interactions, "4" for IBM® WebSphere® Process Server (WPS) interactions and so forth. When the problem is suspected to be only database interactions, then a "1" may be selected in field 403 so as to only trace the database component instead of tracing the entire application thereby minimizing the tracing overhead. In one embodiment, field 403 is an optional field, and if nothing is specified, then all messages are traced based on trace type.

Trace header 400 additionally includes field 404 (identified by "TraceID") which identifies a particular set of trace rules to perform the tracing operation. For example, the trace identifier in field 404 that is sent with the first message trace header should be used for all the remaining messages till the expiry time so that message broker 103 knows which properties are to be applied. It is possible to have the same sending application 101 send two trace headers 400 for two different types of messages with different settings having TraceDateTime (indicates when tracing is to begin) (discussed further below) and Expiry (defines the lifetime of a trace) (discussed further below). For instance, assume that the first type of message is Extensible Markup Language (XML), with TraceID 404 being 1 and with TraceDateTime and Expiry as "2011-12-04:07-05-00" and "2011-12-04:08-05-00," respectively. In one embodiment, such trace header values are stored by message broker 103. Subsequent messages from the same sending application 101 are to send the same trace identifier so that message broker 103 applies the trace rules as per the stored information. The same sending application 101 could also send a message of another type (e.g., Message Repository Manager (MRM)) with TraceID 404 being 2 with a different TraceDateTime and Expiry rules along with other trace header values. Sending application 101 may now send XML messages with trace ID 404 being 1 and MRM messages with trace ID being 2 so that message broker 103 can apply the rules accordingly. In one embodiment, field 404 is an optional field.

In addition, trace header 400 includes field 405 (identified by "PutAppName") which defines the name of sending application 101 (e.g., application 101A) whose messages are to be traced.

Furthermore, trace header 400 includes field 406 (identified by "TraceDateTime") which indicates when tracing is to begin. In one embodiment, the TraceDateTime field 406 is used to specify when the trace is to occur for all the messages coming from a specific sending application 101 at the specified date time. When field 406 is used along with the Expiry field (defines the lifetime of a trace) (discussed further below), the messages may be traced until the expiry time. In one embodiment, field 406 is an optional field. In one embodiment, when field 406 is used, the trace header values sent by sending application 101 (for the first message) are stored by message broker 103. For every other message, sending application 101 has to send the same TraceID 404 in the first message.

Trace header 400 further includes field 407 (identified by "Expiry") which defines the lifetime of a trace. If nothing is specified in field 407, then the trace is only performed for that message. If traces have to be performed for the messages being sent by sending application 101 at the next particular date and time, then field 407 should be used. In one embodiment, when field 407 is used, TraceID field 404 and PutAppName field 405 are to be used as well.

Trace header 400 additionally includes field 408 (identified by "Format") which indicates the format of the trace output. In one embodiment, certain processing applications, such as message broker 103, may use binary format of the trace to reduce the trace overhead and then use a separate commend to convert the binary trace to user readable format. In one embodiment, field 408 is an optional field.

In addition, trace header 400 includes field 409 (identified by "Persistence") which is used when the TraceDateTime field 406 and Expiry field 407 are used. In one embodiment, the value of Persistence field 409 is set to "1" to indicate that the trace header information is to be stored in a persistence store (e.g., disk unit 308) so that the trace request information is maintained after restarting message broker 103. For the other case, the value of Persistence field 409 is set to "0" indicating that the trace header information is not to be stored in a persistence store.

Furthermore, trace header 400 includes field 410 (identified by "UserID") which is an identifier of the user of sending application 101. In one embodiment, field 410 is used to determine if the user of sending application 101 has the privilege to request a trace of the message. The identifier of the user of sending application 101 may be checked against an access control list maintained by message broker 103. If nothing is specified in field 410, then any user request is accepted.

Additionally, trace header 400 includes field 411 (identified by "Group") which is used to specify a group of users of sending applications 101 whose requests are to be accepted. If Group field 411 is used in connection with UserID field 410, then the user identifier of sending application 101 is checked against the group specified in Group field 411. Only those users that belong to the group and have permission to request a trace of the message as a result of being listed in the access control list can request for a trace. If an identifier is not specified in UserID field 410 (i.e., UserID field 410 is blank), then any user that is part of the group specified in Group field 411 can request a trace if that group is listed in the access control list maintained by message broker 103.

Trace header 400 further includes field 412 (identified by "ProcessServiceName") which decides which processing applications (e.g., message broker 103) can implement the tracing operations defined by trace header 400. In one embodiment, field 412 is an optional field. In one embodiment, field 412 is primarily used if there is a set of processing applications that receive a message with the same trace header 400. For example, assuming that a message with the same trace header 400 is processed by multiple processing applications (e.g., message broker 103) during its end to end processing cycle, then, if the value in field 412 is not specified, all processing applications will implement the tracing operations defined by trace header 400. However, if field 412 identifies a specific processing application name (e.g., data flow engine in message broker 103), then only that processing application (e.g., data flow engine in message broker 103) will activate the trace of the message. In another example, field 412 may be used to enable matching traces to be implemented by multiple services (e.g., WebSphere® MQ and WebSphere® message broker) (services specified in field 412) as the message is received by these services.

Trace header 400 further includes field 413 (identified by "Priority") which specifies the priority of the tracing. If there are multiple messages with trace request information, then field 413 aids message broker 103 in deciding the priority of the tracing thread. In one embodiment, field 413 is an optional field.

In addition, trace header 400 includes field 414 (identified by "HostName") which indicates the host on which traces should be activated. When trace header 400 contains the hostname and if it matches the hostname on which message broker 103 is running, then only the trace is activated for that message. In one embodiment, field 414 may be used by message broker 103 in a distributed load balancing environment. For example, assume that message broker 103 is configured to run in a load balancing environment on homogeneous/heterogeneous machines and there is problem while processing the messages on a particular host machine (due to configuration or dependency issues), then tracing should be performed for only those message being processed on that particular host. Since it may be difficult to predict how a load balancer will distribute the message to the systems, it would be helpful to allow tracing to be controlled for a specific host. If a host is not specified in field 414 (i.e., field 414 is blank), then the message will be traced on any of the machines.

Furthermore, trace header 400 includes field 415 (identified by "TraceUsage") which specifies the usage of the trace. For example, a "1" in field 415 may represent tracing being performed on messages in production mode, a "2" in field 415 may represent tracing being performed on messages on a test machine, and a "3" in field 415 may represent tracing being performed on messages in development mode. Based on the particular processing application (e.g., message broker 103), the processing application may provide different levels of priority depending on the usages of the trace. For example, message broker 103 may provide a higher priority for performing message tracing on a test machine than in production mode.

As discussed above, trace header 400 is placed in the message by sending application 101 and will be used by message broker 103 to dynamically control the tracing of messages as discussed below in connection with FIGS. 5A-5B.

FIGS. 5A-5B are a flowchart of a method 500 for dynamically controlling a tracing of messages in accordance with an embodiment of the present invention.

Referring to FIG. 5A, in conjunction with FIGS. 1-4, in step 501, message broker 103 receives a message from a sending application 101 (e.g., application 101A).

In step 502, a determination is made by message broker 103 as to whether the message includes trace header 400.

If the message does not include trace header 400, then, in step 503, message broker 103 will perform normal message processing.

If, however, the message includes trace header 400, then, in step 504, a determination is made by message broker 103 as to whether the sender (i.e., the user of sending application 101) has permission to request the tracing of the message. As discussed above, fields 410 and 411 of trace header 400 may be used to determine whether the user of sending application 101 has permission to request the tracing of the message in light of an access control list maintained by message broker 103. A discussion of using fields 410 and 411 of trace header 400 to determine whether the user of sending application 101 has permission to request the tracing of the message is discussed below in connection with FIG. 6.

FIG. 6 is a flowchart of the sub-steps of determining whether the sender has permission to request the tracing of the message (step 504) in accordance with an embodiment of the present invention.

Referring to FIG. 6, in conjunction with FIGS. 1-4, in step 601, message broker 103 determines whether the user identifier is defined by sending application 101. As discussed above, such an identifier, if present, would be stored in field 410.

If the user identifier is defined by sending application 101, then, in step 602, message broker 103 determines whether a group identifier (e.g., identifier of a group of users) is defined by sending application 101. As discussed above, such an identifier, if present, would be stored in field 411.

If there is a group identifier defined by sending application 101, then, in step 603, message broker 103 determines whether the user (user of application 101, such as application 101A, that sent a message to message broker 103 in step 501 of FIG. 5A) belongs to the identified group of users.

If the user belongs to the identified group of users, or if there is only a user identifier defined by sending application 101 (i.e., there is not a group identifier defined by sending application 101 but there is a user identifier defined by sending application 101), then, in step 604, message broker 103 checks the identifier of the user of sending application 101 against the access control list maintained by message broker 103.

In step 605, message broker 103 determines whether the user of sending application 101 has the privilege to request tracing based on whether the identifier of the user of sending application 101 is listed in the access control list.

If the identifier of the user of sending application 101 is listed in the access control list, then, in step 606, message broker 103 permits sending application 101 to request tracing.

If, however, the identifier of the user of sending application 101 is not listed in the access control list, then, in step 607, message broker 103 does not perform tracing of the message.

Referring to step 603, if the user does not belong to the identified group of users, then, in step 607, message broker 103 does not perform tracing of the message.

Referring to step 601, if there is not a user identifier identified by sending application 101, then, in step 608, message broker 103 determines whether there is a group identifier (identifier of a group of users) defined by sending application 101.

If there is not a group identifier defined by sending application 101, then message broker 103 permits sending application 101 to request tracing in step 606.

If, however, there is a group identifier defined by sending application 101, then, in step 609, message broker 103 determines whether the identified group of users is defined in the access control list maintained by message broker 103.

If the identified group of users is not defined in the access control list, then, in step 607, message broker 103 does not perform tracing of the message.

If, however, the identified group of users is defined in the access control list, then message broker 103 permits sending application 101 to request tracing in step 606.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

Returning to step 504 of FIG. 5A, in conjunction with FIGS. 1-4, if the user of sending application 101 does not have permission to request the tracing of the message, then, in step 505, message broker 103 does not perform tracing of the message.

If, however, the user of sending application 101 does have permission to request the tracing of the message, then, in step 506, a determination is made by message broker 103 as to whether the trace header information in trace header 400 is to be stored in a persistence store. As discussed above, field 409 of trace header 400 may be used to determine whether the trace header information in trace header 400 is to be stored in a persistence store.

If the trace header information is to be stored in a persistence store, then, in step 507, message broker 103 stores the trace header information in a persistence store.

If, however, trace header information is not to be stored in a persistence store, or upon storing the trace information in the persistence store, then, in step 508, a determination is made by message broker 103 as to whether there is a trace identifier in trace header 400. As discussed above, an identifier of a specific set of trace rules may be included in field 404 of trace header 400.

If an identifier of a specific set of trace rules is stored within field 404 of trace header 400, then, in step 509, message broker 103 determines if the trace identifier is a known identifier. If the trace identifier is a known identifier, then, in step 510, message broker 103 performs tracing of the message by applying the trace rules identified in field 404 of trace header 400.

Returning to step 508, if there is not a trace identifier in trace header 400, then, in step 511, message broker 103 determines whether field 404 of trace header 400 indicates a special operation is to be performed, such as those involving TraceDateTime field 406 and Expiry field 407 as discussed above.

If trace header 400 indicates a special operation is to be performed, then, in step 512, message broker 103 raises an exception (used to indicate that an error has occurred while running the program). In one embodiment, one mechanism for raising an exception is to use what is referred to as a "throw." In one embodiment, such an exception is thrown using the throw statement.

Upon throwing the exception, message broker 103 waits to receive another message from a sending application 101 (e.g., application 101A) in step 501.

Returning to steps 509, 511, if the trace identifier is not a known identifier or if trace header 400 does not indicate a special operation is to be performed, then, referring to FIG. 5B, in conjunction with FIGS. 1-4, in step 513, a determination is made by message broker 103 as to whether a host is identified for the tracing to occur. As discussed above, field 414 of trace header 400 identifies the host on which traces should be activated.

If a host is identified for tracing to occur, then, in step 514, message broker 103 performs the trace of the message on the host designated within trace header 400. Otherwise, in step 515, message broker 103 will trace the message on any of the machines.

Upon determining whether a host is identified for tracing to occur, a determination is made in step 516 by message broker 103 as to whether a specific processing application is identified to activate the trace of the message. As discussed above, field 412 of trace header 400 decides which processing applications (e.g., message broker 103) can implement the tracing operations defined by trace header 400.

If a specific processing application is identified to activate the trace of the message, then, in step 517, message broker 103 instructs the identified processing application (e.g., message broker 103) to activate the trace of the message.

If, however, a specific processing application is not identified to activate the trace of the message, then, in step 518, message broker 103 instructs all processing applications that receive the message to activate the trace of the message.

In some implementations, method 500 may include other and/or additional steps that, for clarity, are not depicted. Further, in some implementations, method 500 may be executed in a different order presented and that the order presented in the discussion of FIGS. 5A-5B is illustrative. Additionally, in some implementations, certain steps (e.g., steps 504-518) in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for dynamically controlling a tracing of messages, the method comprising:
    randomly selecting messages by message flow threads, wherein an error occurred while processing a message from a sending application of said messages randomly selected through a message flow thread of said message flow threads, wherein said message comprises a header, wherein said header comprises a structure for storing fields of data used for defining tracing operations, wherein one or more of said fields of data are used for determining whether a user of said sending application has permission to trace said message in light of an access control list maintained by a message broker; and
    performing, by a processor, a trace of said message in response to said header indicating said trace is to be performed.

2. The method as recited in claim 1 further comprising:
storing trace information from said header in a persistence store in response to said header indicating to store said trace information from said header in said persistence store.

3. The method as recited in claim 1 further comprising:
performing said trace of said message by applying trace rules associated with a trace identifier stored in said header.

4. The method as recited in claim 1 further comprising:
performing said trace of said message on a host specified within said header.

5. The method as recited in claim 1 further comprising:
instructing a processing application specified within said header to activate said trace of said message.

6. The method as recited in claim 1 further comprising:
instructing all processing applications that receive said message to activate said trace of said message.

7. The method as recited in claim 1 further comprising:
checking an identifier of said user of said sending application in said header against said access control list to determine whether said user of said sending application has permission to request said trace of said message.

* * * * *